(12) United States Patent
Chan et al.

(10) Patent No.: US 7,369,421 B1
(45) Date of Patent: May 6, 2008

(54) FULL BRIDGE DRIVER

(75) Inventors: Chun-Kong Chan, Hsi Chih (TW); Jeng-Shong Wang, Hsin Chuang (TW)

(73) Assignee: Lien Chang Electronic Enterprise Co., Ltd., Taipei County (TW)

( * ) Notice: Subject to any disclaimer, the term of this patent is extended or adjusted under 35 U.S.C. 154(b) by 0 days.

(21) Appl. No.: 11/650,524

(22) Filed: Jan. 8, 2007

(30) Foreign Application Priority Data

Dec. 1, 2006 (TW) ............................. 95144819 A

(51) Int. Cl.
*H02M 7/5387* (2007.01)
*H02M 7/44* (2006.01)

(52) U.S. Cl. ...................................... 363/132
(58) Field of Classification Search .................. 363/17, 363/98, 132
See application file for complete search history.

(56) References Cited

U.S. PATENT DOCUMENTS

| | | | |
|---|---|---|---|
| 5,119,000 A * | 6/1992 | Schultz | 318/400.25 |
| 5,841,646 A * | 11/1998 | Cornec | 363/56.08 |
| 7,173,836 B2 * | 2/2007 | Chan et al. | 363/132 |
| 7,242,594 B2 * | 7/2007 | Chan et al. | 363/17 |
| 7,245,509 B1 * | 7/2007 | Chan et al. | 363/17 |

* cited by examiner

*Primary Examiner*—Gary L. Laxton
(74) *Attorney, Agent, or Firm*—Rosenberg, Klein & Lee

(57) ABSTRACT

A full bridge driver includes a control chip outputting a first control signal and a second control signal, a full bridge switch assembly with four N-MOSs coupled to a DC power, a first side of a transformer, and two drivers. Moreover, one of the two drivers includes a first cut-off switch that turns off the first N-MOS in response to the first control signal, a first charging path coupled between the DC power and the second N-MOS, a first discharging path coupled between the gate end and the source end of the first N-MOS. Furthermore, another one of the two drivers includes a second cut-off switch that turns off the third N-MOS in response to the second control signal, a second charging path coupled between the DC power and the fourth N-MOS, and a second discharging path coupled between the gate end and the source end of the third N-MOS.

18 Claims, 7 Drawing Sheets

FULL BRIDGE DRIVER

BACKGROUND OF THE INVENTION

1. Field of the Invention

The present invention relates to a full bridge driver and, more particularly, to a full bridge driver controlled by a push/pull control chip to drive a load.

2. Description of Related Art

The power supply for a backlight source of a TFT LCD panel makes use of an inverter circuit to convert energy and turn a cold cathode fluorescent lamp (CCFL) on. Conventional inverter circuits can be divided into half bridge-types, full-bridge types and push/pull-types according to different circuit topologies. An inverter circuit is a circuit for converting DC power into AC power.

As shown in FIG. 1, a transformer T1 divides the circuit into a front-end circuit on the first side 101 and a rear-end circuit on the second side 102. The front-end circuit on the first side 101 comprises a DC voltage source Vcc, a first switch Q1, and a second switch Q2. The rear-end circuit on the second side 102 comprises at least one capacitor (C1, C2, C3), a load, and at least one diode (D1, D2). A push/pull control chip 103 is connected between the front-end circuit on the first side 101 and the rear-end circuit on the second side 102.

Reference is also made to FIG. 2 as well as FIG. 1. The push/pull control chip 103 outputs a first control signal a and a second control signal b to turn the switching actions of the two switches Q1 and Q2 on the first side 101, respectively. A DC power Vcc is used to provide energy, and the transformer T1 raises and converts the voltage of the DC power Vcc to the rear-end circuit 102 for driving the load. The output voltage waveform c on the second side of the transformer T1 is the voltage waveform at point C. As shown in FIG. 2, the output voltage waveform c on the second side is an AC voltage waveform. In the above description, the push/pull control chip 103 can be an LX1686, an LX1688 or an LX1691 push/pull control chip produced by Linfinity (Microsemi) Corporation, or an 0Z9RR, an 0Z9930, an 0Z9938 or an 0Z9939 push/pull control chip produced by O2 Micro International Limited, or a TL-494 or a TL-595 push/pull control chip produced by TEXAS INSTRUMENTS, or a BIT3193, a BIT3713, a BIT3715 or a BIT3501 push/pull control chip produced by Beyond Innovation Technology.

As shown in FIG. 3, a transformer T2 divides the circuit into a front-end circuit on the first side 201 and a rear-end circuit on the second side 202. The front-end circuit on the first side 201 comprises four electronic switches (P1, P2, N1, N2), a full bridge control chip 203 and a capacitor C1. Moreover the rear-end circuit on the second side 202 comprises a load.

Referring to FIG. 4, the full bridge control chip 203 transmits four control signals (POUT1, POUT2, NOUT1, NOUT2) to the four electronic switches (P1, P2, N1, N2), respectively; by switching those switches, power is supplied to the load through the transformer T2 according to the DC power. The full bridge control chip 203 is the BIT3105 of the Beyond Innovation Technology Corp or the OZ960, OZ964, OZ9925, OZ9910, OZL68, OZ9938 or OZ9939 of the O2-MICRO Corp.

In the above description, driving the full bridge switch assembly requires the full bridge control chip 203 and driving the push/pull inverter requires the push/pull control chip 103, thus the prior art lacks practical flexibility. Furthermore, the control chip of the inverter circuit is limited in use so as to be difficult to purchase together.

SUMMARY OF THE INVENTION

Accordingly, the primary object of the present invention is to use two similar drivers to connect the two output terminals of the push/pull control chip separately and the gates of the full bridge switch assembly composed of the four N-MOSs. The two similar drivers are controlled by the push/pull control chip to drive the switching actions of the full bridge switch assembly.

The full bridge driver of the present invention is connected to the two terminals of a first side of a transformer and a DC power. The full bridge driver comprises a push/pull control chip having a first output terminal and a second output terminal, the first and second output terminals separately output a first control signal and a second control signal both with a duty cycle smaller than 50%; a first cut-off switch couples to the first output terminal of the control chip; a first diode having a positive (P) terminal couples to the DC power; a first resistor couples to a negative (N) terminal of the first diode and the first cut-off switch; a first capacitor couples to the negative (N) terminal of the first diode and one end of the first side of the transformer; a first N-MOS having a gate couples to the first cut-off switch and a drain couples to the DC power and a source couples to one end of the first side of the transformer; a second N-MOS having a gate couples to the first output terminal of the control chip and a drain couples to the source of the first N-MOS and a source couples to a reference terminal.

Moreover, the full bridge driver further comprises a second cut-off switch coupled to the second output terminal of the control chip; a second diode having a positive (P) terminal couples to the DC power; a second resistor couples to a negative (N) terminal of the second diode and the second cut-off switch; a second capacitor couples to the negative (N) terminal of the second diode and another end of the first side of the transformer; a third N-MOS having a gate couples to the second cut-off switch and a drain couples to the DC power and a source coupled to another end of the first side of the transformer; and a fourth N-MOS having a gate couples to the second output terminal of the control chip and a drain couples to the source of the third N-MOS and a source couples to the reference terminal.

The full bridge driver of the present invention uses two drivers in the conventional full bridge driver circuit to match a push/pull control chip for control. The present invention has higher flexibility in practical use, and isn't limited by the control chip. Moreover, manufacturers only need to use push/pull control chips to drive and control push/pull driver circuits or full bridge driver circuits.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
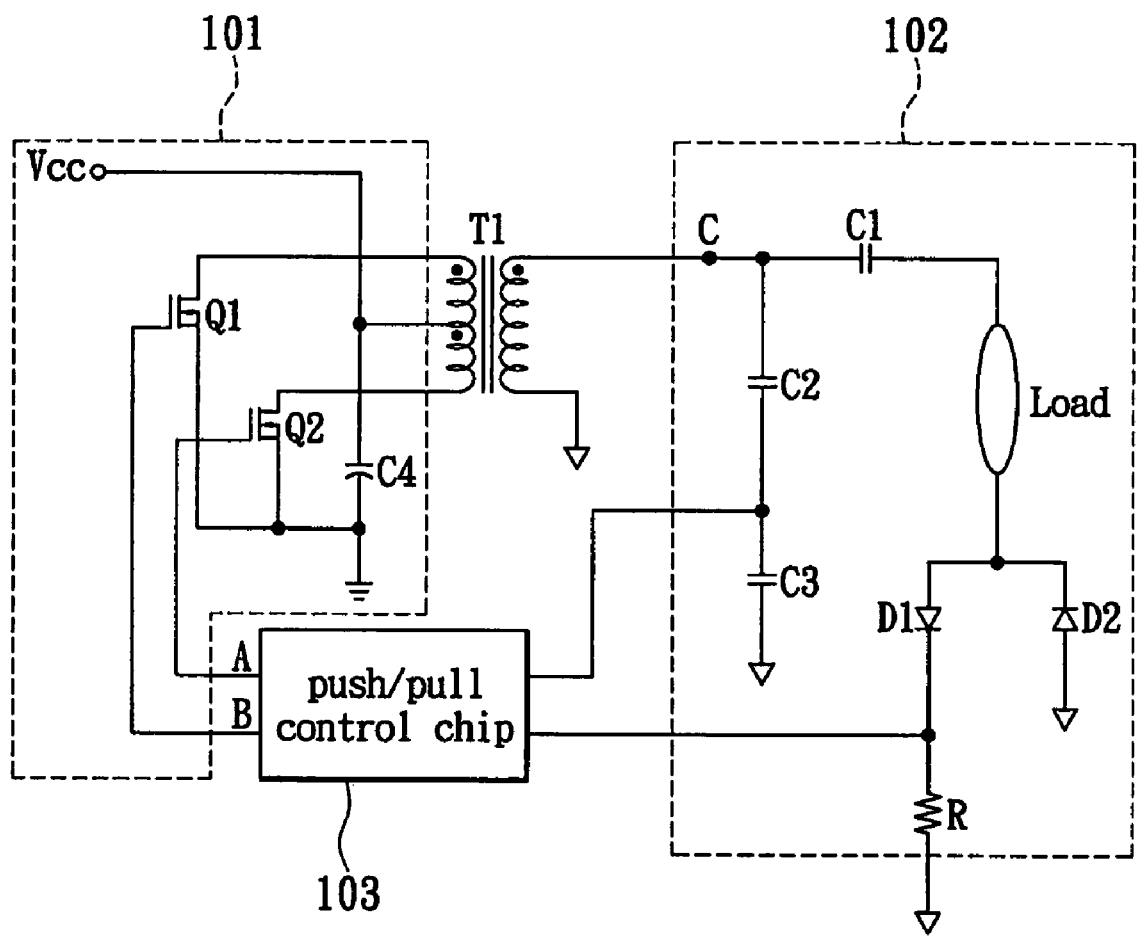
FIG. 1 is a circuit schematic diagram of a prior art push/pull inverter driving the load.
Figure 2:
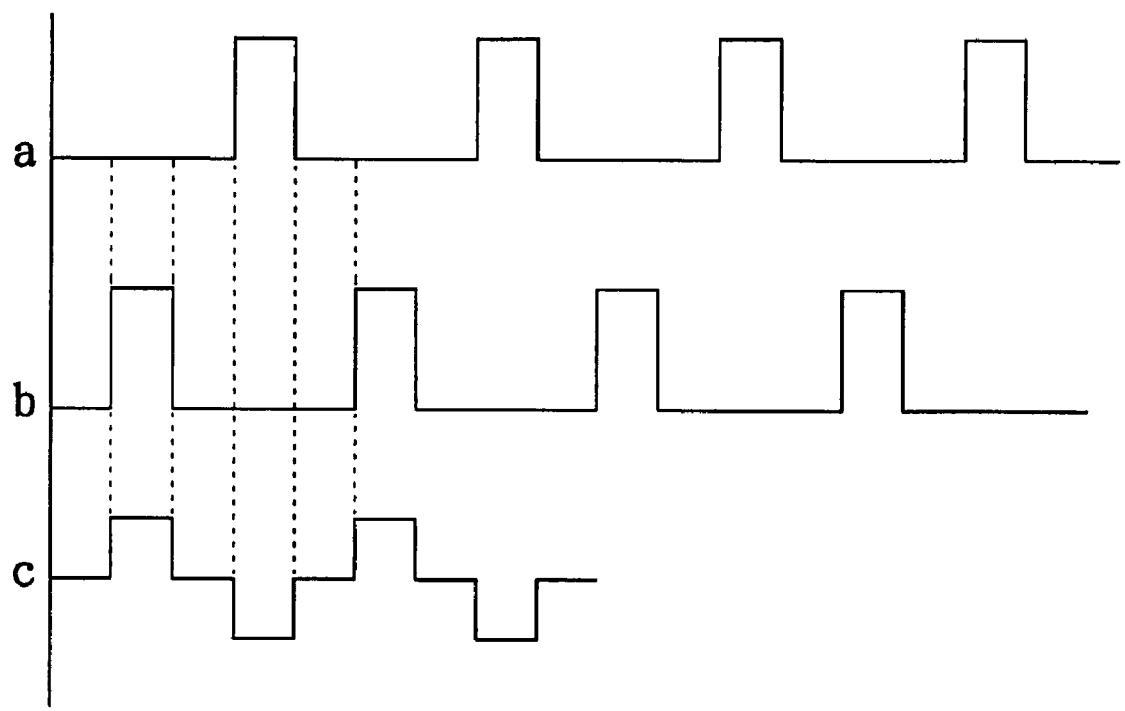
FIG. 2 is a wave schematic diagram of control signals of the push/pull control chip and the output voltage of the load.
Figure 3:
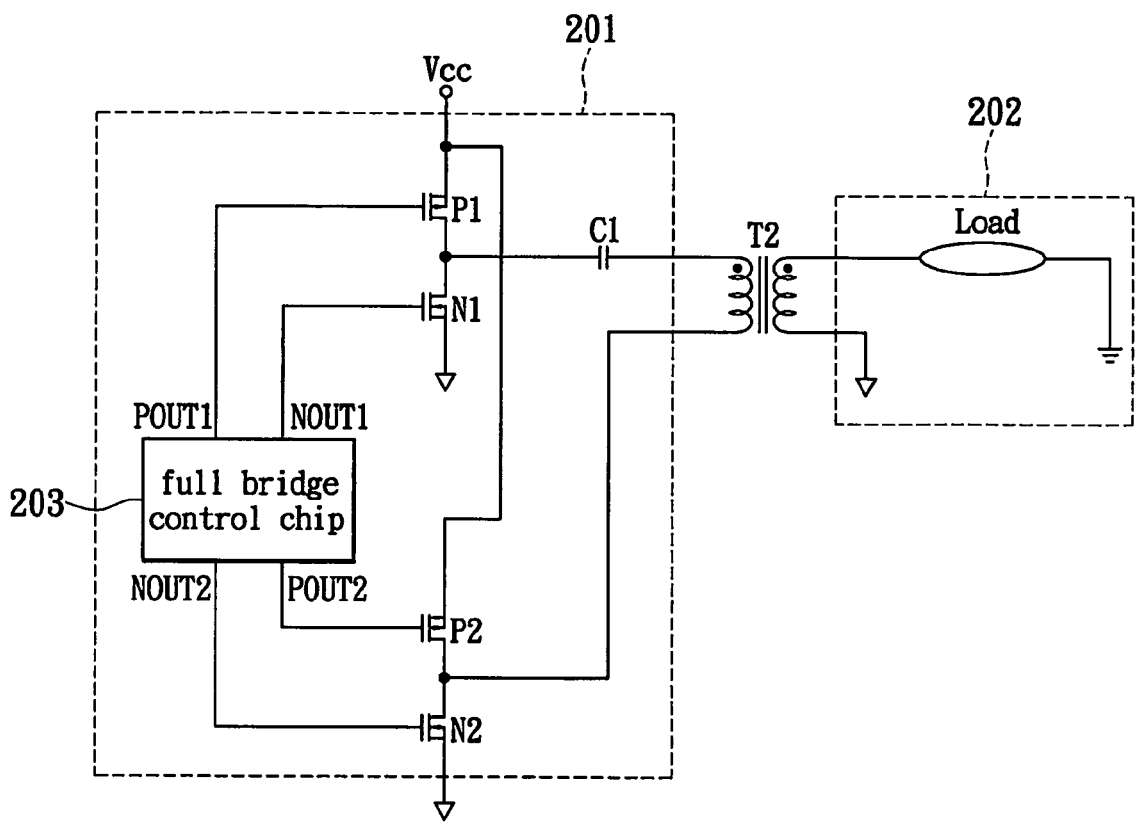
FIG. 3 is a circuit schematic diagram of a prior art full bridge inverter driving the load.
Figure 4:
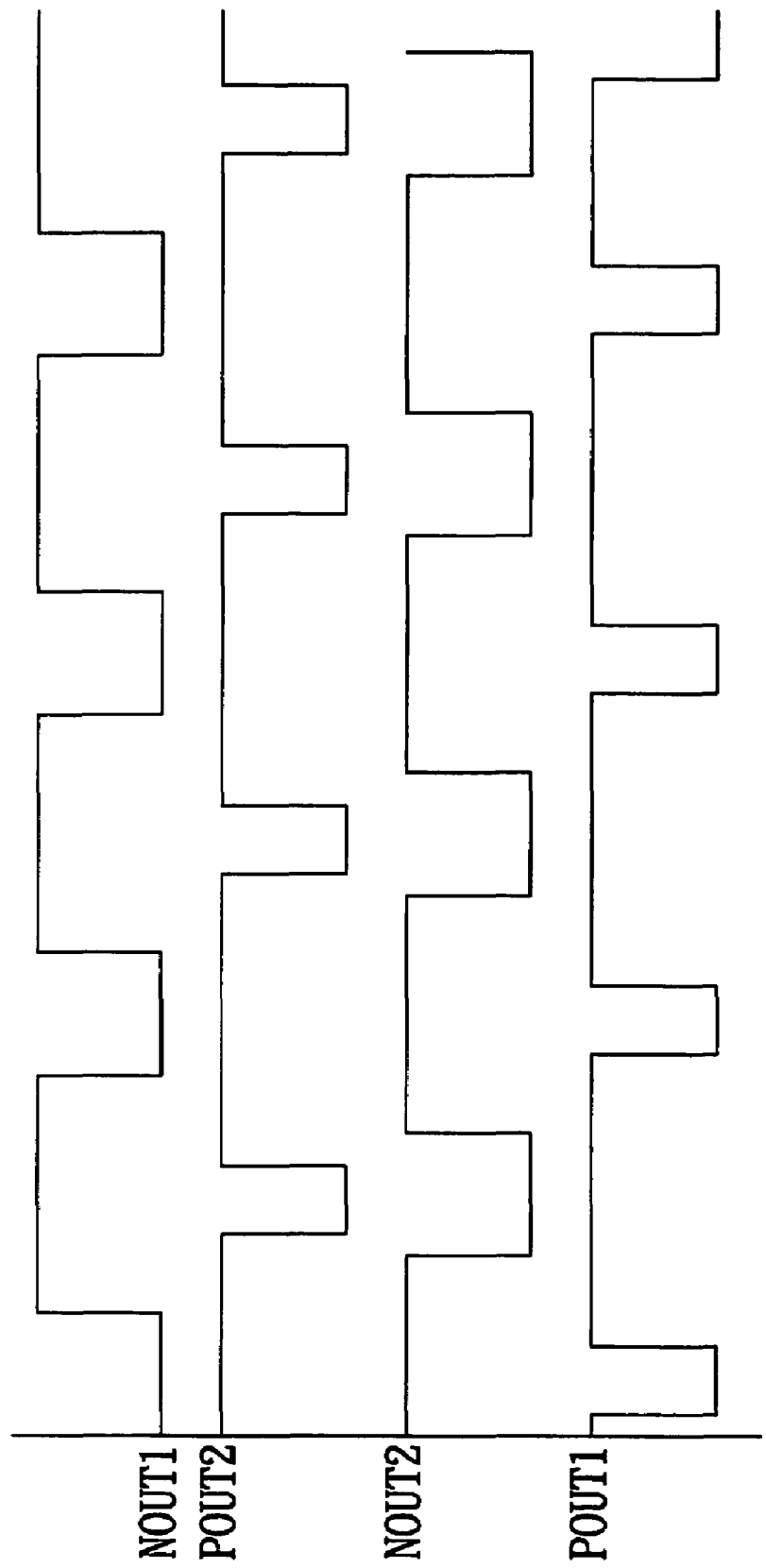
FIG. 4 is a wave schematic diagram of control signals of a prior art full bridge inverter.
Figure 5:
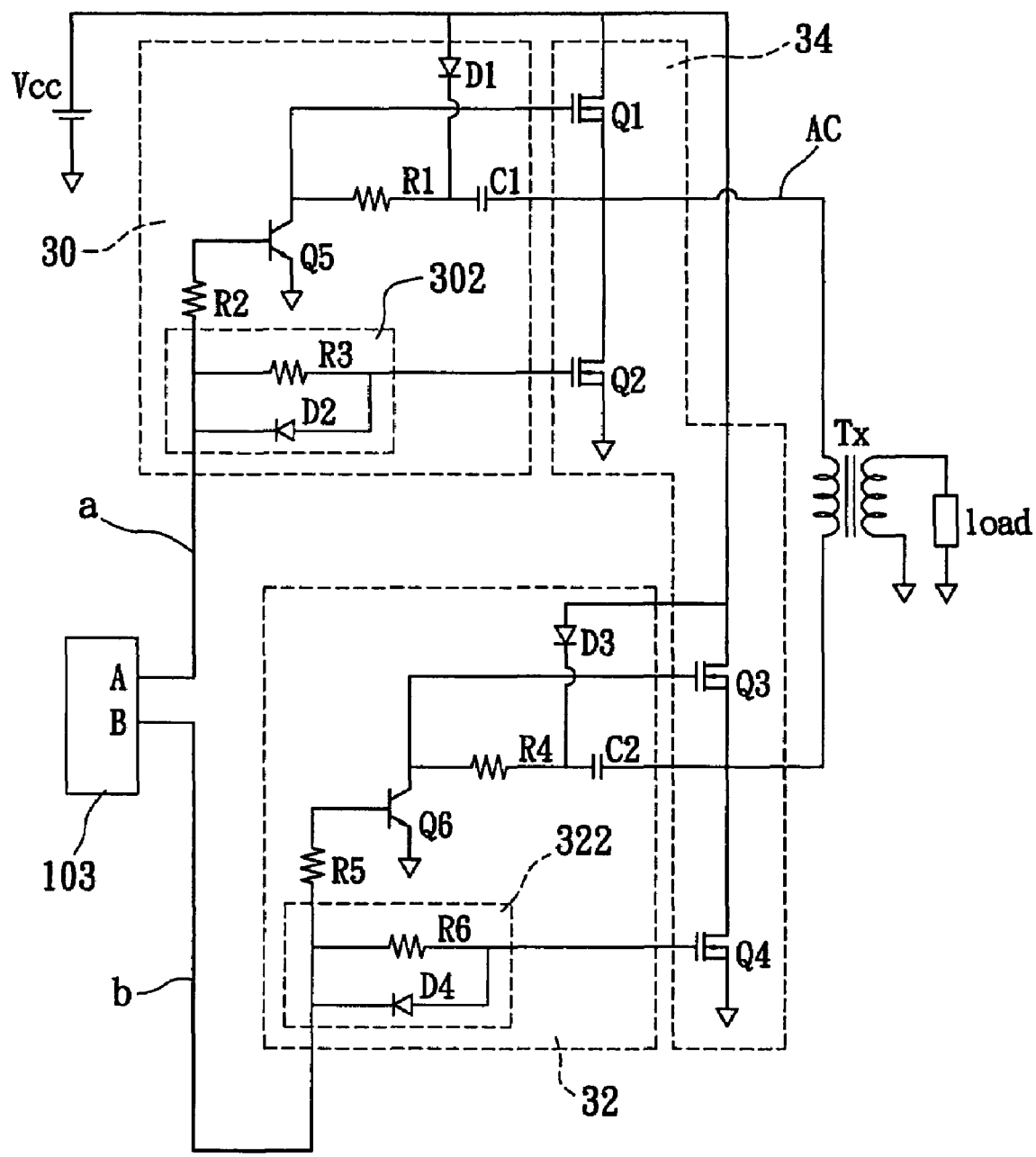
FIG. 5 is a circuit diagram of the full bridge inverter according to a first embodiment of the present invention.

As shown in FIG. 5, a full bridge driver according to the first embodiment of the present invention is connected to a first side of a transformer Tx to convert a DC power Vcc to an AC power. The AC power provides electric energy required by the load via the transformer Tx.

Reference is made to FIG. 5 again. The full bridge driver according to the first embodiment of the present invention comprises a push/pull control chip 103, a first driver 30, a second driver 32, and a full bridge switch assembly 34. The push/pull control chip 103 has a first output terminal A and a second output terminal B. The first output terminal A and the second output terminal B output a first control signal a and a second control signal b both with a duty cycle smaller than 50%, respectively. The full bridge switch assembly 34 is composed of four N-MOSs (Q1, Q2, Q3, Q4).

The first driver 30 couples to the first output terminal A of the push/pull control chip 103 and the DC power Vcc for receiving the first control signal a so as to drive a first N-MOS Q1 and a second N-MOS Q2 of the full bridge switch assembly 34. Moreover, a drain of the first N-MOS Q1 couples to the DC power Vcc, and a source of the first N-MOS Q1 couples to one end of the first side of the transformer Tx. A drain of the second N-MOS Q2 couples to the source of a first N-MOS Q1, and a source of the second N-MOS Q2 couples to a reference terminal G.

The second driver 32 couples to the second output terminal B of the push/pull control chip 103 and the DC power Vcc for receiving the second control signal b so as to drive a third N-MOS Q3 and a fourth N-MOS Q4 of the full bridge switch assembly 34. Moreover, a drain of the third N-MOS Q3 couples to the DC power Vcc, and a source of the third N-MOS Q3 couples to another end of the first side of the transformer Tx. A drain of the fourth N-MOS Q4 couples to the source of a third N-MOS Q3, and a source of the fourth N-MOS Q4 couples to the reference terminal G. The full bridge switch assembly 34 is controlled by the first driver 30 and the second driver 32 to convert the DC power Vcc to the AC power. The AC power is transmitted to the first side of the transformer Tx.

Reference is made to FIG. 5 again. The first driver 30 comprises a first cut-off switch Q5, a first diode D1, a first resistor R1, a first capacitor C1, and a first buffer circuit 302. The first cut-off switch Q5 is a BJT transistor, which has a base coupled to the first output terminal A of the push/pull control chip 103 and an emitter coupled to the reference terminal G and a collector coupled to one end of a first resistor R1. In the first driver 30, the positive (P) terminal of a first diode D1 couples to the DC power Vcc and the negative (N) terminal of a first diode D1 couples to another end of the first resistor R1. Moreover, the first capacitor C1 couples to the negative (N) terminal of a first diode D1 and one end of the first side of the transformer Tx. The first buffer circuit 302 couples to the first output terminal A of the push/pull control chip 103 and the second N-MOS Q2 of the full bridge switch assembly 34, wherein the first buffer circuit 302 comprises a first accelerating diode D2 and a third resistor R3. The first accelerating diode D2 has a negative (N) terminal coupled to the first output terminal A of the push/pull control chip 103 and a positive (P) terminal coupled to the gate of a second N-MOS Q2. Moreover, the third resistor R3 parallel couples to the first accelerating diode D2. Furthermore, the first cut-off switch Q5 can also be a light-coupled switch.

Furthermore, the circuit of the second driver 32 is the same as the first driver 30 mentioned above. As shown in FIG. 5, the second driver 32 comprises a second cut-off switch Q6, a second diode D3, a second resistor R4, a second capacitor C2, and a second buffer circuit 322. The second cut-off switch Q6 is a BJT transistor, which has a base coupled to the second output terminal B of the push/pull control chip 103 and an emitter coupled to the reference terminal G and a collector coupled to the one end of a second resistor R4. In the second driver 32, the positive (P) terminal of a second diode D3 couples to the DC power Vcc and the negative (N) terminal of a second diode D3 couples to another end of the second resistor R4. Moreover, the second capacitor C2 coupled to the negative (N) terminal of a second diode D3 and one end of the first side of the transformer Tx. The second buffer circuit 322 couples to the second output terminal B of the push/pull control chip 103 and the fourth N-MOS Q4 of the full bridge switch assembly 34, wherein the second buffer circuit 322 comprises a second accelerating diode D4 and a fourth resistor R6. The second accelerating diode D4 has a negative (N) terminal coupling to the second output terminal B of the push/pull control chip 103 and a positive (P) terminal coupling to the gate of fourth N-MOS Q4. Moreover, the fourth resistor R6 parallel couples to the second accelerating diode D4. Furthermore, the second cut-off switch Q6 can also be a light-coupled switch.

In the above description, the DC power Vcc provides a positive DC power +Vcc for the transformer Tx through conduction of the first N-MOS Q1 and the fourth N-MOS Q4 to form a positive half-cycle of driving, or provides a negative DC power −Vcc for the transformer Tx through conduction of the second N-MOS Q2 and the third N-MOS Q3 to form a negative half-cycle of driving.

Figure 6:
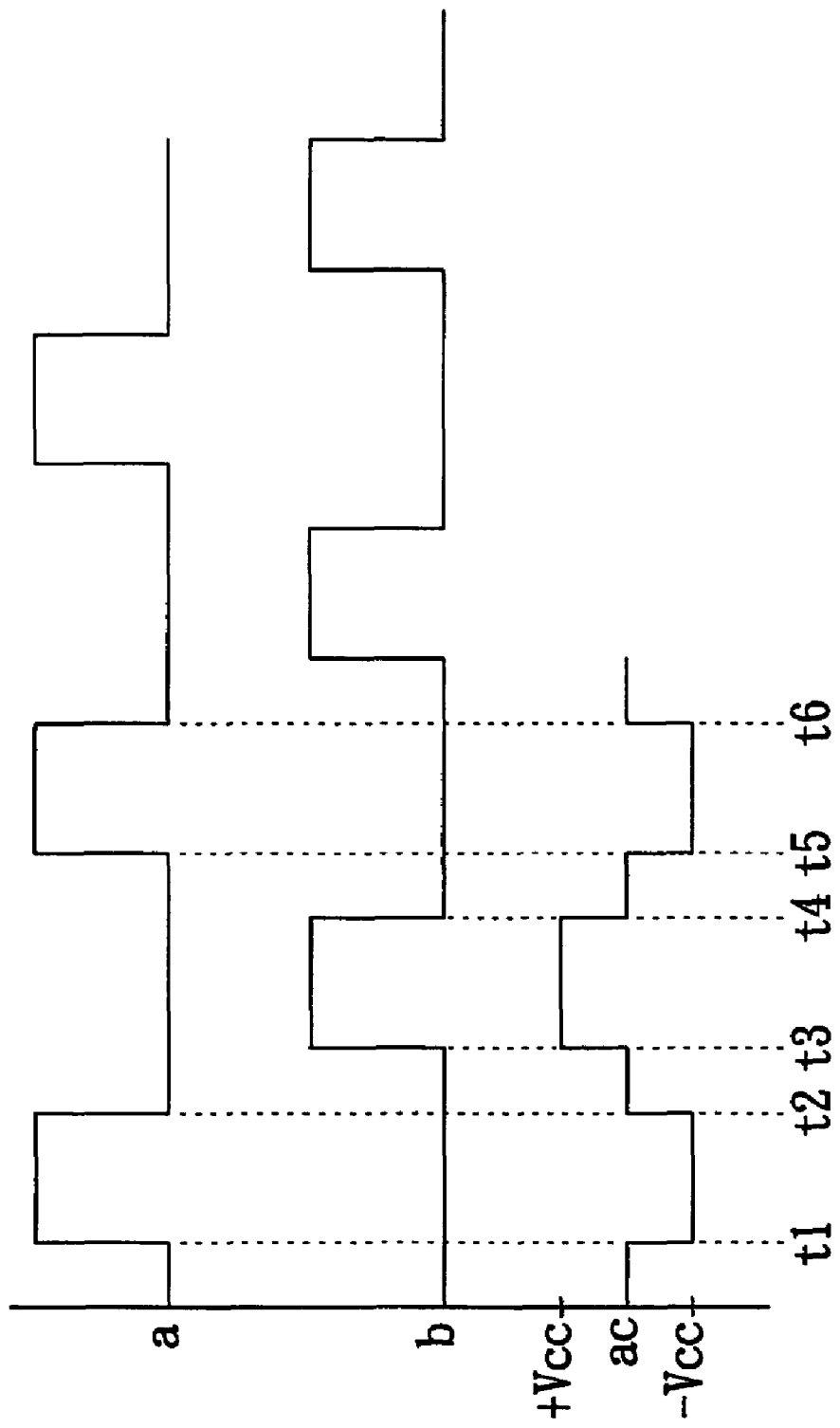
FIG. 6 is a waveform diagram of the output signals of the push/pull control chip and the AC power voltage of the present invention.

Reference is made to FIG. 6 as well as FIG. 5. The push/pull control chip 103 can be the LX1686 push/pull control chip produced by Linfinity (Microsemi) Corporation, or the 0Z9RR, 0Z9936, 0Z9932 or 0Z9930 push/pull control chip produced by O2 Micro International Limited. Because there are so many brands in the market, only those in common use are listed above.

As shown in FIG. 6, the output terminal A of the push/pull control chip 103 outputs the first control signal a, and the output terminal B of the push/pull control chip 103 outputs the first control signal b. A voltage waveform ac of the AC power can be obtained on the first side of the transformer Tx.

Reference is made to FIG. 6 as well as FIG. 5 again. At a time $t_1$ to $t_2$, the first control signal a is at the high level, while the second control signal b is at the low level. The first control signal a is transmitted to the gate of the second N-MOS Q2 via the first resistor R3 and the first cut-off switch Q5 to turn on the second N-MOS Q2 and the first cut-off switch Q5. The first cut-off switch Q5 that is turned on couples the gate of a first N-MOS Q1 to the reference terminal G to keep the first N-MOS Q1 off. At the same time, the first diode D1 and the first capacitor C1 form a charging path, and the DC power Vcc charges the first capacitor C1 for building a positive voltage via the charging path in response to the conducted second N-MOS Q2.

Moreover, the second control signal b at the low level is transmitted to the gate of the fourth N-MOS Q4 via the fourth resistor R6 and the second cut-off switch Q6 to turn off the fourth N-MOS Q4 and the second cut-off switch Q6. As a result of the second capacitor C2 having built a positive voltage during the preceding work-cycle, at the same time, the positive voltage on the second capacitor C2 is transmitted between the gate and the source of a third N-MOS Q3 via the second resistor R4 for turning on the third N-MOS Q3, wherein the second capacitor C2 and the second resistor R4 form a discharging path.

Therefore, at the time $t_1$ to $t_2$, the second N-MOS Q2 and the third N-MOS Q3 are on, while the first N-MOS Q1 and the fourth N-MOS Q4 are off. At this time, because the second N-MOS Q2 and the third N-MOS Q3 are on, the DC power Vcc can transmit energy to the first side of the transformer Tx. The voltage waveform ac obtained on the first side of the transformer Tx is a negative DC power −Vcc.

Reference is made to FIG. 6 as well as FIG. 5 again. At a time $t_2$ to $t_3$, the first control signal a drops from the high level to the low level, and the second control signal b maintains at the low level. At this time, the second N-MOS Q2 enters the off state through the acceleration of the first accelerating diode D2, and the first cut-off switch Q5 enters the off state similarly. At the same time, the positive voltage on the first capacitor C1 is transmitted between the gate and the source of a first N-MOS Q1 via the first resistor R1 for turning on the first N-MOS Q1, wherein the first capacitor C1 and the first resistor R1 form a discharging path. Because the second control signal b maintains at the low level, the third N-MOS Q3 is on, while the fourth N-MOS Q4 is off.

Therefore, at the time $t_2$ to $t_3$, the first N-MOS Q1 and the third N-MOS Q3 are on, while the second N-MOS Q2 and the fourth N-MOS Q4 is off. In the above descriptions, both the first N-MOS Q1 and the third N-MOS Q3 are on, making the first side of the transformer Tx be short-circuited. At this time, the voltage waveform ac obtained on the first side of the transformer Tx is at a zero potential.

Reference is made to FIG. 6 as well as FIG. 5 again. At time $t_3$ to $t_4$, the first control signal a maintains at the low level, while the second control signal b rises from the low level to the high level. The second control signal b is transmitted to the gate of the fourth N-MOS Q4 via the second resistor R6 and the second cut-off switch Q6 to turn on the fourth N-MOS Q4 and the second cut-off switch Q6. The second cut-off switch Q6 that is turned on couples the gate of a third N-MOS Q3 to the reference terminal G to keep the third N-MOS Q3 off. At the same time, the second diode D3 and the second capacitor C2 are formed a charging path, and the DC power Vcc charge the second capacitor C2 for building a positive voltage via the charging path in response to the conducted fourth N-MOS Q4. Because the first control signal a maintains at the low level, the first N-MOS Q1 is on, while the second N-MOS Q3 is off.

Therefore, at time $t_3$ to $t_4$, the second N-MOS Q2 and the third N-MOS Q3 are off, while the first N-MOS Q1 and the fourth N-MOS Q4 are on. At this time, because the first N-MOS Q1 and the fourth N-MOS Q4 are on, the DC power Vcc can transmit energy to the first side of the transformer Tx. The voltage waveform ac obtained on the first side of the transformer Tx is a positive DC power +Vcc.

Reference is made to FIG. 6 as well as FIG. 5 again. At time $t_4$ to $t_5$, the first control signal a maintains at the low level, and the second control signal b drops from the high level to the low level. At this time, the fourth N-MOS Q4 enters the off state through the acceleration of the second accelerating diode D4, and the second cut-off switch Q6 enters the off state similarly. At the same time, the positive voltage on the second capacitor C2 is transmitted between the gate and the source of a third N-MOS Q3 via the second resistor R4 for turning on the third N-MOS Q3, wherein the second capacitor C2 and the second resistor R4 are formed a discharging path. Because the first control signal a maintains at the low level, the first N-MOS Q1 is on, while the second N-MOS Q2 is off.

Therefore, at time t4 to t5, the first N-MOS Q1 and the third N-MOS Q3 are on, while the second N-MOS Q2 and the fourth N-MOS Q4 is off. In the above descriptions, both the first N-MOS Q1 and the third N-MOS Q3 are on, making the first side of the transformer Tx be short-circuited. At this time, the voltage waveform ac obtained on the first side of the transformer Tx is at a zero potential.

Reference is made to FIG. 6 as well as FIG. 5 again. In the present invention, the circuit actions of the full bridge driver and the voltage waveform ac obtained on the first side of the transformer Tx at time t5 to t6 repeat those at time t1 to t2. In this way, an AC power for providing energy is formed. At the same time, the transformer Tx boosts the AC power and then provides energy for the load from the second side.

Figure 7:
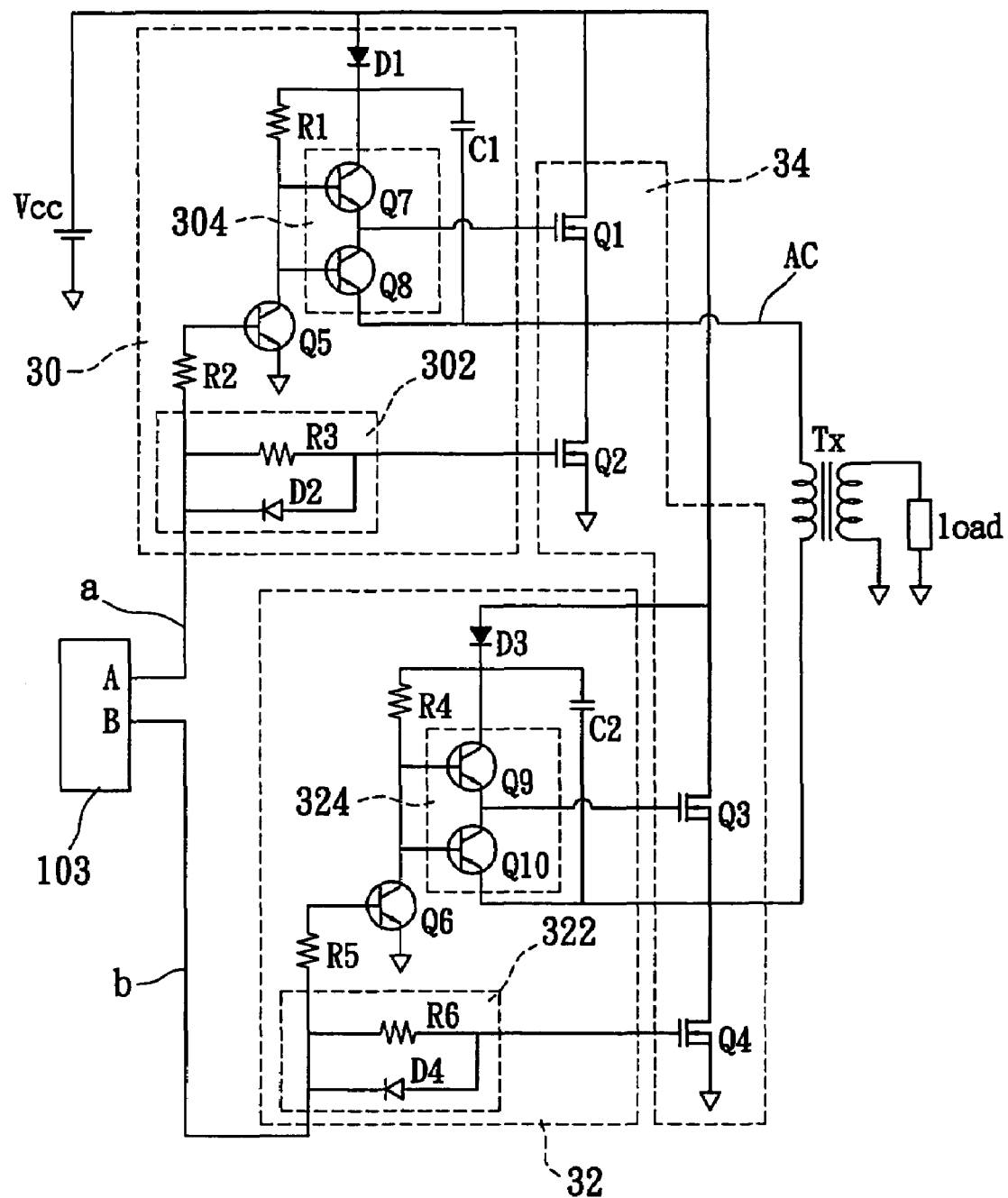
FIG. 7 is a circuit diagram of the full bridge inverter according to a second embodiment of the present invention.

Reference is made to FIG. 7 as well as FIG. 5. In this second embodiment, components identical to those used in the first embodiment are labeled with the same symbols. The circuit actions and achieved effects of this second embodiment are the same as those of the first embodiment. This second embodiment differs from the first embodiment only in that the second embodiment further comprises a first signal amplifier 304 and a second signal amplifier 324.

The first signal amplifier 304 is coupled between the first N-MOS Q1 and the first cut-off switch Q1, moreover, the second signal amplifier 324 is coupled between the third N-MOS Q3 and the second cut-off switch Q6. Furthermore, both the first signal amplifier 304 and the second signal amplifier 324 are complementary transmission switches.

Reference is made to FIG. 7. In this second embodiment, when the first cut-off switch Q5 is off, that makes the NPN transformer Q7 enter the off state and makes the PNP transformer Q8 enter the on state. Moreover, the conducted PNP transformer Q8 turns on the first N-MOS Q1. Alternatively, when the first cut-off switch Q5 is on, that makes the NPN transformer Q7 enter the on state and makes the PNP transformer Q8 enter the off state. Moreover, the conducted NPN transformer Q7 turns off the first N-MOS Q1.

In the above description, because the circuit actions and achieved effects of the second signal amplifier 324 are the same as those of the first signal amplifier 304, this is not restated.

To sum up, the full bridge driver of the present invention can connect the two drivers 30, 32 to the conventional full bridge inverter circuit to match the push/pull control chip 103 for control. Hence, there is higher flexibility in practical use and the present invention is not limited by the control chip. Moreover, manufacturers only need to use the push/pull control chip 103 to drive and control a push/pull inverter circuit or a full bridge inverter circuit.

Although the present invention has been described with reference to the preferred embodiments thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

What is claimed is:

1. A full bridge driver connected to a first side of a transformer and a DC power, the full bridge driver comprising:
   a control chip having a first output terminal and a second output terminal, the first and second output terminals separately outputting a first control signal and a second control signal both with a duty cycle smaller than 50%;
   a first cut-off switch coupling to the first output terminal of the control chip;
   a first diode having a positive (P) terminal coupling to the DC power;
   a first resistor coupling to a negative (N) terminal of the first diode and the first cut-off switch;
   a first capacitor coupling to the negative (N) terminal of the first diode and one end of the first side of the transformer;
   a first N-MOS having a gate coupling to the first cut-off switch and a drain coupling to the DC power and a source coupling to one end of the first side of the transformer;
   a second N-MOS having a gate coupling to the first output terminal of the control chip and a drain coupling to the source of the first N-MOS and a source coupling to a reference terminal;
   a second cut-off switch coupling to the second output terminal of the control chip;
   a second diode having a positive (P) terminal coupling to the DC power;
   a second resistor coupling to a negative (N) terminal of the second diode and the second cut-off switch;
   a second capacitor coupling to the negative (N) terminal of the second diode and another end of the first side of the transformer;
   a third N-MOS having a gate coupling to the second cut-off switch and a drain coupling to the DC power and a source coupling to another end of the first side of the transformer; and
   a fourth N-MOS having a gate coupling to the second output terminal of the control chip and a drain coupling to the source of the third N-MOS and a source coupling to the reference terminal.

2. The full bridge driver as claimed in claim 1, wherein the DC power provides a positive DC power through conduction of the first N-MOS and the fourth N-MOS for the transformer to form a positive half-cycle of driving.

3. The full bridge driver as claimed in claim 1, wherein the DC power provides a negative DC power through conduction of the second N-MOS and the third N-MOS for the transformer to form a negative half-cycle of driving.

4. The full bridge driver as claimed in claim 1 further comprising a first buffer circuit, wherein the first buffer circuit includes:
   a first accelerating diode having a negative (N) terminal coupling to the first output terminal of the control chip and a positive (P) terminal coupling to the gate of the second N-MOS; and
   a third resistor parallel coupling to the first accelerating diode.

5. The full bridge driver as claimed in claim 1 further comprising a second buffer circuit, wherein the second buffer circuit includes:
   a second accelerating diode having a negative (N) terminal coupling to the second output terminal of the control chip and a positive (P) terminal coupling to the gate of the fourth N-MOS; and
   a fourth resistor parallel coupling to the second accelerating diode.

6. The full bridge driver as claimed in claim 1, wherein the first cut-off switch is a light-coupled switch.

7. The full bridge driver as claimed in claim 1, wherein the second cut-off switch is a light-coupled switch.

8. The full bridge driver as claimed in claim 1 further comprising a first signal amplifier and a second signal amplifier, wherein the first signal amplifier is coupled between the first N-MOS and the first cut-off switch; the second signal amplifier is coupled between the third N-MOS and the second cut-off switch.

9. The full bridge driver as claimed in claim 8, wherein both the first signal amplifier and the second signal amplifier are complementary transmission switches.

10. A full bridge driver connected to a first side of a transformer and a DC power, the full bridge driver comprising:
    a control chip for outputting a first control signal and a second control signal both with a duty cycle smaller than 50%;
    a first N-MOS coupling to the DC power and one end of the first side of the transformer;
    a second N-MOS coupling to the first N-MOS, the control chip and a reference terminal;
    a first cut-off switch coupling to the control chip and the first N-MOS, wherein the first cut-off switch turns off the first N-MOS in response to the first control signal;
    a first charging path coupling to the DC power and the second N-MOS;
    a first discharging path coupling between the gate and the source of the first N-MOS;
    a third N-MOS coupling to the DC power and another end of the first side of the transformer;
    a fourth N-MOS coupling to the third N-MOS, the control chip and the reference terminal;
    a second cut-off switch coupling to the control chip and the third N-MOS, wherein the second cut-off switch turns off the third N-MOS in response to the second control signal;
    a second charging path coupling to the DC power and the fourth N-MOS; and
    a second discharging path coupling between the gate and the source of the third N-MOS.

11. The full bridge driver as claimed in claim 10, wherein the first charging path comprises:
    a first diode having a positive (P) terminal coupling to the DC power; and
    a first capacitor coupling to a negative (N) terminal of the first diode and the second N-MOS.

12. The full bridge driver as claimed in claim 11, wherein the first discharging path is effectively formed by coupling a first resistor and the first capacitor.

13. The full bridge driver as claimed in claim 10, wherein the second charging path comprises:
    a second diode having a positive (P) terminal coupled to the DC power; and
    a second capacitor coupling to a negative (N) terminal of the second diode and the fourth N-MOS.

14. The full bridge driver as claimed in claim 13, wherein the second discharging path is effectively formed by coupling a second resistor and the second capacitor.

15. The full bridge driver as claimed in claim 10, wherein the first cut-off switch is a light-coupled switch.

16. The full bridge driver as claimed in claim 10, wherein the second cut-off switch is a light-coupled switch.

17. The full bridge driver as claimed in claim 10 further comprising a first signal amplifier and a second signal amplifier, wherein the first signal amplifier is coupled between the first N-MOS and the first cut-off switch; the second signal amplifier is coupled between the third N-MOS and the second cut-off switch.

18. The full bridge driver as claimed in claim 17, wherein both the first signal amplifier and the second signal amplifier are complementary transmission switches.

* * * * *